Sept. 1, 1942.  E. V. BARKER  2,294,440
METHOD OF BALING
Original Filed Nov. 2, 1939    4 Sheets-Sheet 1

Inventor
EROS V. BARKER
by
Attorneys

Sept. 1, 1942. E. V. BARKER 2,294,440
METHOD OF BALING
Original Filed Nov. 2, 1939 4 Sheets-Sheet 2

Inventor
EROS V. BARKER
by
Attorneys

Sept. 1, 1942.  E. V. BARKER  2,294,440
METHOD OF BALING
Original Filed Nov. 2, 1939   4 Sheets-Sheet 3

Inventor
EROS V. BARKER
by
Attorneys

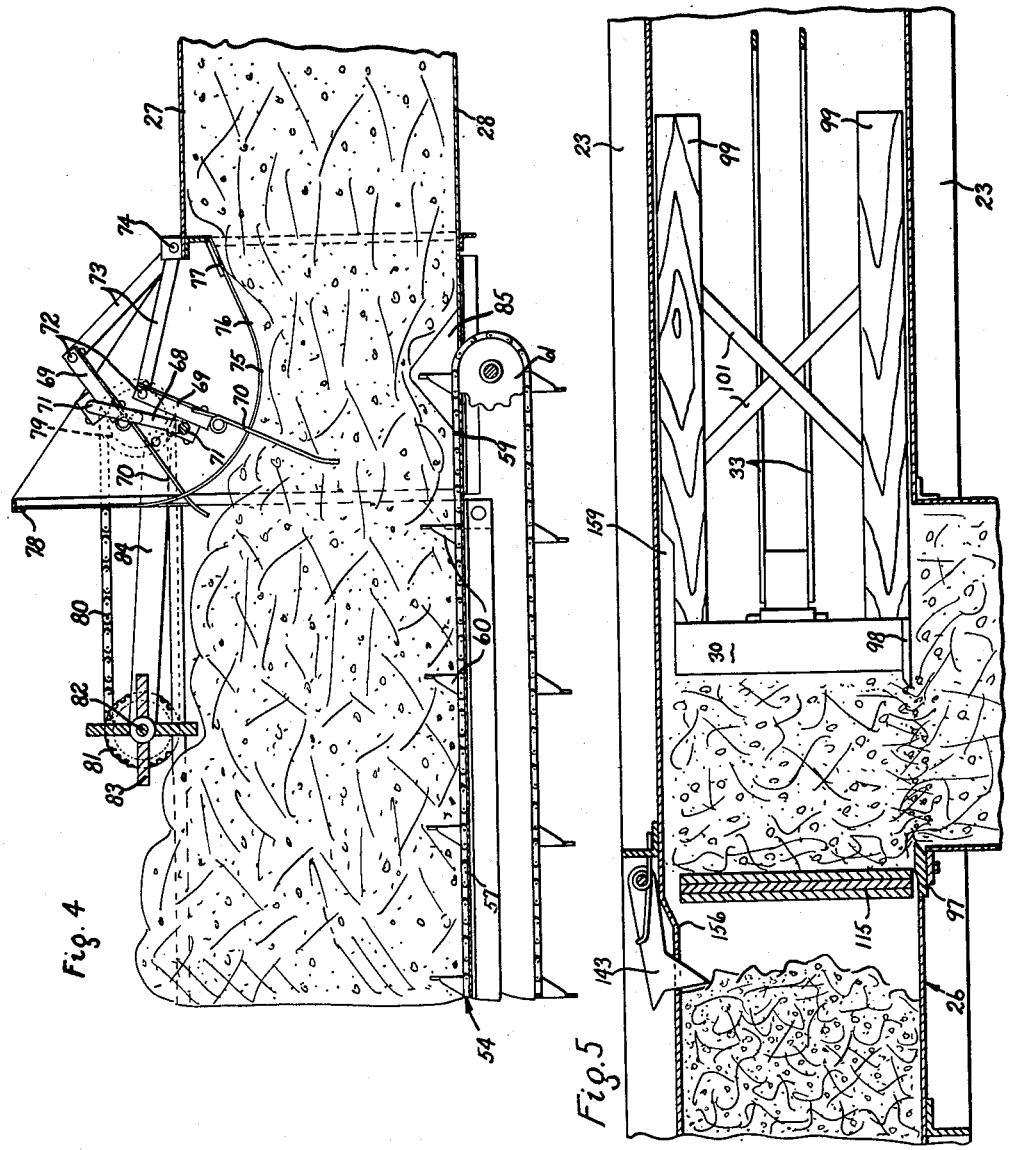

Patented Sept. 1, 1942

2,294,440

UNITED STATES PATENT OFFICE 2,294,440

METHOD OF BALING

Eros V. Barker, Bellevue, Ohio, assignor to The Ohio Cultivator Company, Bellevue, Ohio, a corporation of Ohio Original application November 2, 1939, Serial No. 302,579. Divided and this application June 19, 1940, Serial No. 341,223

9 Claims. (Cl. 100—25)

This in a division of application No. 302,579, filed November 2, 1939.

This invention relates to a baler, and more particularly to a baler which is adapted to pick up the hay or other material directly from the ground as the baler is drawn along. It is an object of my invention to devise a pick-up baler which is of simplified construction and which is smaller in dimensions so that it is more easily handled in the field and is stored in a smaller space; and at the same time, the improved baler of my invention is lighter in weight than pick-up balers heretofore employed and, in addition, consumes less power by reason of the elimination of the operation of lifting the hay up to the top of the baler.

Another object of my invention is to devise a pick-up baler having a side feed, the feeding device feeding the hay or like material into the side of the present chamber rather than into the top thereof as has been common heretofore. The feeding of the baler from the side is advantageous in that it assures a more uniform bale on the top and bottom and in that it simplifies the construction of the machine, thereby rendering it lighter and more economical to build and at the same time saves the power required to lift the hay in order to feed it from the top.

It is a further object to provide a side loader which eliminates the long inclined loading platform which has heretofore been used in the art with more or less unsuccessful results. By eliminating the inclined elevating conveyor of the prior art, it is possible with the instant invention to fold the side loader into a compact position by elevating it on a hinge at the side of the machine at one end of the side loader into a vertical position.

It is a further object to provide a side loader that is mounted upon suitable wheels at adjustable distances above the surface of the ground in which side loader feeding fingers pass between light weight strips on to a transverse feeding platform that easily feeds the hay towards shearing position where it is sheared in accurate increments prior to being moved into the compression chamber by the plunger.

Another object is to devise a baler wherein the compressing plunger is advanced relatively slowly and is retracted at relatively high speed, it being allowed to dwell at substantially its retracted position for a considerable period of time so as to allow the feeding mechanism to feed in a greater charge of hay or the like preparatory to the forward stroke of the plunger; this is accomplished by the use of a special linkage for moving the pressing plunger which linkage is designed to give improved results.

Another object is to devise a side-fed pressing chamber which is provided with shearing blades on its side for cutting off the hay quickly and accurately as the plunger head passes by the forward edge of the feed opening of the feeding chamber.

It is an object of this invention to provide a side feed shearing mechanism operating with a compression plunger so that the material being fed in through the side of the chamber is accurately sheared, eliminating the necessity of repeated packings of the hay in the chamber before the spacer block can be dropped.

Still another object is to eliminate the feed arm which has been used on balers heretofore devised, thereby simplifying the construction and lowering the cost of repairs.

Another object is to provide a fully automatic feeder for feeding the baler, thereby eliminating the necessity of having a man tend to the feeding and lowering the labor cost of operating the machine.

Another object is to devise an automatic division block dropper which places the block in the baler and which overcomes the necessity for losing three or four strokes of the plunger before the block can be dropped; in this way, the production of the machine is increased considerably.

A further object of the invention is to provide in association with this mechanism means for controlling the dropping of the block which is actuated by the amount of hay that is being pressed into the compression chamber so that when a sufficient amount of hay has been compressed and loaded into the compression chamber, this device will have been actuated sufficiently to bring about a release of the spacer block. And furthermore, this is accomplished by synchronizing with the plunger packing the hay into the compression chamber, so that the block will drop into position when the plunger is withdrawn.

It is a further object to provide adjustable contact blades on the mechanism for controlling the dropping of the spacer block so that a varying amount of hay can be compressed in the compression chamber to vary the size of the bale.

Another object is to devise a baler in which the feeding mechanism is automatically slowed up in speed as the plunger begins its forward stroke and speeded up while the plunger is dwelling at the rear of its stroke; this is accomplished without completely stopping either the plunger or the feeding mechanism so that the operation is continuous and the necessity for overcoming the inertia of stopped parts is avoided.

Still other objects will more fully hereinafter appear.

In the accompanying drawings:

Figure 4 is a transverse vertical sectional view showing a portion of the side feeding mechanism for feeding the hay into the press chamber.

Figure 5 is a horizontal section similar to Figure 3, showing a modification of baling chamber.

General arrangement

Figure 1:
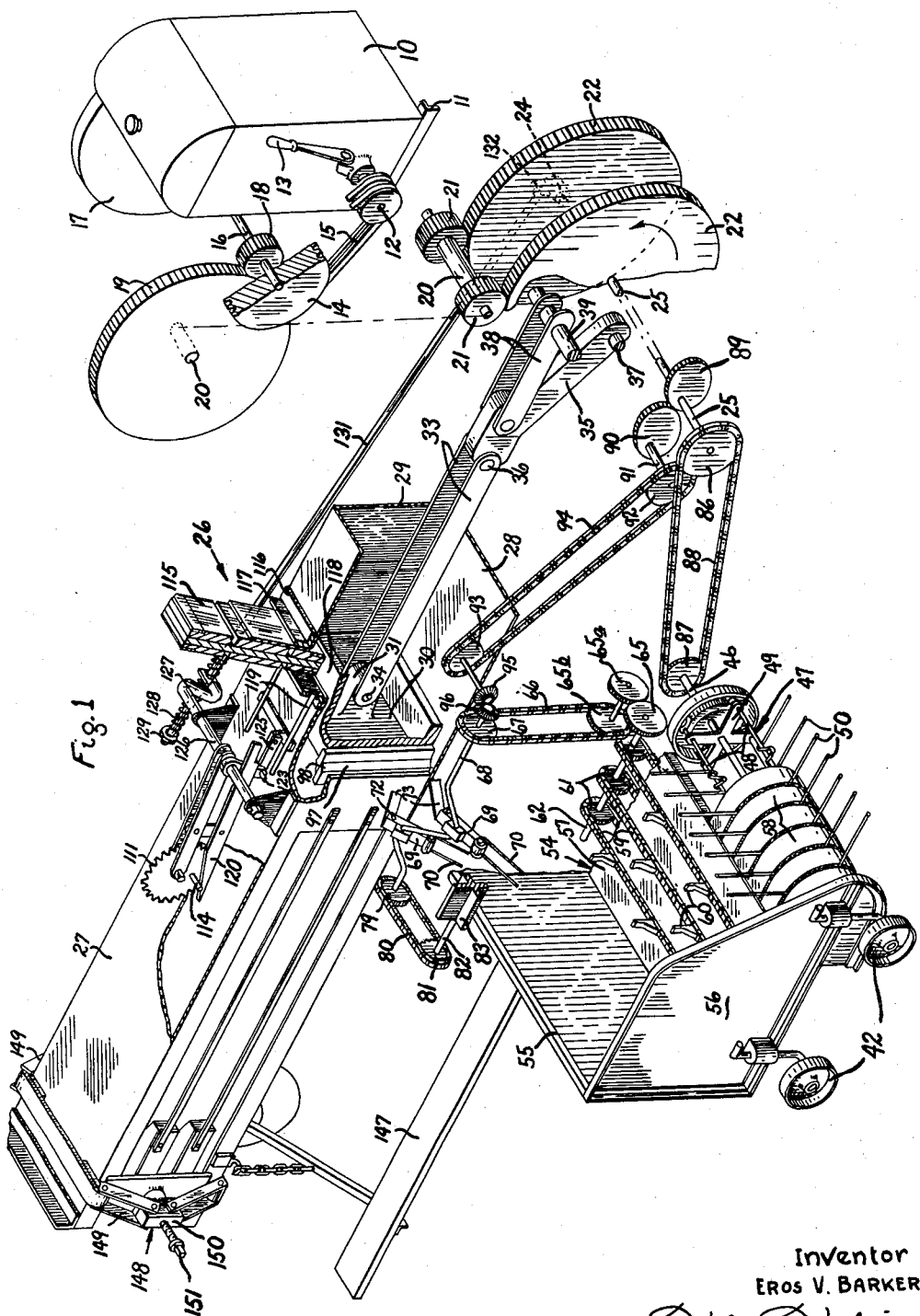
Figure 1 is a diagrammatic perspective view showing the general arrangement of the machine; in this figure, certain of the parts have been separated from their actual position in order to make the showing more clear.

The baler illustrated in the drawings is of the type adapted to be drawn along the windrow in the field by a tractor or other suitable draft source. However, the baler is adapted for stationary use as well. The baler mechanism is operated by a power unit preferably carried on the baler frame itself and which may take the form of an internal combustion engine. The power unit drives both the feeding mechanism and the baling mechanism. The pick-up and feeding mechanism are carried at the side of the machine as a foldable element adapted to be folded up into substantially a vertical position for transportation or the like. The pick-up elements transfer the hay to a relatively low feeding table upon which are operated suitable conveyor means which convey the hay deposited thereon into the side opening of the longitudinally disposed baler mechanism when the plunger of the baler is fully retracted. The speed of operation of the feeding device is controlled in accordance with the movement of the pressing plunger, being fast while the plunger is dwelling near the rear end of its stroke and being slowed up materially as the plunger comes forward in a pressing operation. Suitable overhead auxiliary feeding mechanism may be provided above the feeding table for beating the hay downwardly and forwardly into the pressing chamber.

The baler itself comprises a longitudinally disposed pressing chamber in which reciprocates a pressing plunger provided with shearing means cooperating with stationary shearing means to make a clean cut of the hay at each forward stroke of the plunger whereby the insertion of the division block is not interfered with. The pressing chamber is constricted at its extreme outer end by suitable means and the bales are pressed rearwardly of the machine, each bale as it is formed serving as an abutment for the formation of a succeeding bale and being thereafter expelled outwardly through the extreme outer end of the baler. In this specification, the movement of the press plunger during the pressing stroke will be spoken of as a forward movement of the plunger although in reality it is moving towards the rear end of the machine as it is drawn through the field.

Press and plunger operating mechanism

Referring to the drawings in detail, reference numeral 10 denotes an internal combustion power unit carried at the forward end of the machine as on longitudinal frame members 11 and driving a drive pulley 12. A clutch operated by handle 13 may be interposed between engine 10 and drive pulley 12 if desired. Drive pulley 12 is adapted to drive pulley 14 by means of the multiple V-belts 15. Pulley 14 is mounted on a transverse shaft 16 provided with a flywheel 17 and also provided with a pinion 18 enmeshing with a relatively large toothed pinion 19 on transverse shaft 20. Upon shaft 20 are mounted two pinions 21 of relatively small size which are enmeshed with the spaced bull gears 22 which are rotatably mounted in any suitable manner with respect to side frame members 23, as by means of stubshafts 24 and 25 which are fixedly attached to their respective bull gears 22 and which serve to drive mechanism more fully described below. These stubshafts 24 and 25 do not project inwardly of the bull gears 22 so that the space between gears 22 is free for a purpose which will presently appear.

The press generally is designated by the reference numeral 26 and extends rearwardly of the machine from the driving end thereof, being supported upon the machine in any suitable manner. The press comprises a rectangular boxlike device having a substantially closed top 27 and bottom 28, and having side members 29 which leave the sides open for access by the workmen for the insertion of the tying wires. The press plunger is designated generally as 30 and is adapted to be moved to and fro in the forward end of the press 26 by means of the bull gears 22. The plunger 30 is shaped to approximately conform to the inner cross section of the press 26 and is provided with a rearwardly extending central ear 31 which is preferably integral with the one piece plunger head 32 which may desirably be of cast iron. Pitman 33 is pivoted to the ear 31 by means of pivot bolt 34 and is pivoted to one end of a toggle link 35 as at 36. Member 35 is provided with a stationary pivot point 37 about which it is free to rotate. A second pitman member 38 is disposed between bull gears 22 and toggle link 35, being pivoted to bull gears 22 through the intermediary of a T-shaped member 41 having a crank pin 39 and being pivoted to toggle link 35 at 40 which is adjacent pivot point 36 but is disposed along toggle link 35 in a direction towards pivot point 37 and is also disposed slightly outwardly of the center line between pivot points 36 and 37 in a direction towards bull gears 22.

As a result of the linkage interposed between bull gears 22 and press plunger 30, press plunger 30 is caused to be moved in a particularly advantageous manner. The angular movement of crank pin 39 with respect to bull gears 22 will, of course, be uniform but this movement is transmitted to press plunger 30 in such a manner that press plunger 30 is slowly advanced but is very rapidly retracted, thereby allowing a maximum period of time for the charging of the space ahead of the press plunger. In addition, the press plunger will substantially dwell at the rearmost portion of its stroke for a considerable period of time and this dwell coupled with the slow forward movement of the plunger allows a maximum amount of hay to be inserted for each stroke of the plunger.

Feeder and pick-up and drives therefor

The feeder and pick-up assemblies are carried at the right hand side of the machine, their outer end being supported by means of vertically adjustable wheels 42.

The pick-up mechanism is disposed at the forward end of the assembly and comprises a transversely disposed shaft 46 upon which is fixedly mounted a rotatable reel 47 provided with end members 49 which are fixedly attached to shaft 46. Between the ends of the end members 49 are disposed rotatable pipe shafts 48 upon which are fixedly mounted spring pick-up teeth 50. Preferably, these teeth 50 are formed in pairs, each pair being formed from a single piece of spring wire which is coiled around shaft 48 for a revolution and is then coiled in a reverse direction for a second revolution, the middle being fixedly attached to shaft 48 in any suitable manner. The pick-up teeth are adapted to drop below the feed table 54 upon approaching the same. The coil spring providing means to permit the springing of the teeth or mechanical means can be provided to accomplish this motion, thus allowing the teeth 50 to be pulled downwardly out of hay picked up from the ground.

The pick-up device transfers the hay onto a transversely disposed feed table 54 which is provided with a rear wall 55, an end wall 56 and a bottom 57. The transfer from the pick-up reel to the feed table is effected by the aid of flat sheet-like bent members 58 lying between adjacent spring teeth 50 and which are connected in suitable manner to the front edge of the bottom plate 57 of the feed table.

For carrying the hay deposited on the feed table into the feed opening of the press chamber, a series of feed chains 59 having upwardly projecting feed teeth 60 are provided lengthwise of the feed table 54. These feed chains 59 move towards the baling chamber and are mounted around feeding sprockets 61 fixedly attached to a feeding shaft 62, which rotates in a clockwise direction, the outward ends of these chains 59 being mounted around outer idling sprockets 63 which may be journaled with respect to the feeding and pick-up member in any suitable manner. Feeding shaft 62 is likewise journaled below the floor plate 57 of the feeding device, and on its forward end there is fixedly attached a gear 65 driven by a gear 65a fixedly attached to a sprocket 65b encircled by a sprocket chain 66 also encircling an upper sprocket 67 mounted on a rotatable crank shaft 68. Shaft 68 also drives the upper tamping mechanism and the pressing reel. The tamping mechanism comprises a pair of arms 69 (Figures 1 and 4) disposed adjacent the mouth of the baling chamber and provided with spring teeth 70 for engaging the hay. Shaft 68 is rotated in a counter-clockwise direction when viewed as in Figure 4 and is provided with two crank portions 71 disposed opposite one another. Arms 69 are journaled about these crank portions 71 and are pivoted at 72 to link members 73 which are pivoted at 74 to a stationary portion of the mechanism, namely the right hand edge of the top plate 27 of the baling press chamber. Thus, as shaft 68 is rotated in a counter-clockwise direction, the spring teeth 70 reach outwardly and are then moved downwardly compressing the hay inwardly towards the baling chamber, carrying the hay into the baling chamber. After they move inwardly to the end of their stroke, they are withdrawn upwardly for another stroke. The spring teeth 70 project through slots 75 formed between curved sheetmetal guiding plates 76 which are secured at their ends 77 to the left hand upper edge of the feed opening into the baling chamber and are secured at their opposite ends 78 in any suitable manner above the feeder, thus forming a curved throat for guiding the hay into the baling chamber.

Mounted on the rear end of shaft 68 is a pulley 79 which drives a belt 80, in turn driving a pulley 81 fixedly mounted on the end of a shaft 82 upon which is fixedly mounted a reel of wooden paddles 83 (Figure 4), shaft 82 being journaled in any suitable manner as by means of fixed supporting arms 84, thus reel 83 is rotated in a counter-clockwise direction as viewed in Figure 4 during the feeding operation and serves in conjunction with the tamping spring arms 70 to press the hay or stray downwardly so that the conveyor chains 59 may carry it into the press without difficulty.

Arranged below the throat forming portion of sheet guiding member 76 are guiding members 85 disposed over the inward ends of the sprocket feed chains 59 (Figure 4) and these are open at their outward end and closed at their inner end so as to allow the hay to be removed from the conveyor chains 59 at the throat portion referred to above. Thus hay is prevented from being carried downwardly by the feeding teeth 60 on chains 59 at the inward end of the conveyor mechanism.

Thus, it will be seen that the material is fed directly into the side of the press and that the pick-up attachment lifts the hay only to the level of the floor plate 57 of the feeding mechanism, rather than up to the top of the press as on the conventional machine.

The pick-up attachment is driven by a sprocket 86 fixedly mounted on the stubshaft 25 of the left hand bull gear 22, sprocket 86 driving a sprocket 87 fixedly mounted on the pick-up shaft 46 through the intermediary of sprocket chain 88 which encircles sprockets 86 and 87. Thus the pick-up device is driven at a constant speed which is directly proportional to the speed of bull gears 22 or of engine 10.

The feeding mechanism is driven from stub-shaft 25 of bull gears 22 through the interposition of enmeshing elliptical gears 89 and 90, elliptical gear 89 being fixedly mounted on shaft 25 and elliptical gear 90 being mounted on an auxiliary shaft 91 on which is fixedly mounted a sprocket 92 which drives a sprocket 93 through sprocket chain 94, sprocket 93 driving shaft 68 by means of bevel gears 95 and 96, of which bevel gear 96 is fixedly mounted on shaft 68.

Elliptical feeding gears 89 and 90 are so timed with respect to the angular timing of crank pin 39 of the bull gears 22 that the feeding forks 70, the pressing reel 83, and the conveyor chains 59 of the pick-up attachment are speeded up each time the press plunger 30 is away from the feed opening of the press and are slowed down when the plunger 30 is across the feed opening of the press. The coupling of the two effects of the changing speed of operation of the feeding attachment and of the rapid retraction, long dwell in retracted position, and slow forward travel of the press plunger 30 cooperate with one another to make an unusually effective baler which is capable of very great production. While in diagrammatic view of Figure 1, the pick-up and feeding attachment is shown separated from the baling mechanism for the purposes of clarity, it will be understood that the bottom plate 57 of the feeding device and the bottom plate 28 of the baler are on the same horizontal level.

Figure 3:
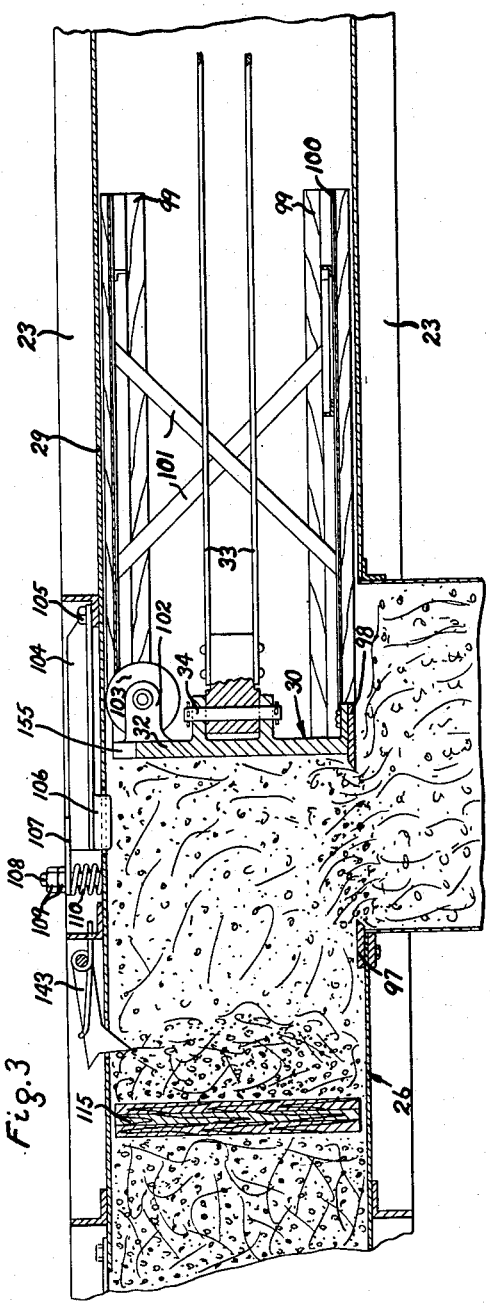
Figure 3 is a horizontal sectional view taken through a portion of the feed chamber and the adjacent portion of the pressing chamber.

In order to make a clean bale and to prevent strands of hay from projecting across the feed opening of the press 26 as the plunger 30 is retracted, a pair of shearing knives are provided on the side of the press opening. These knives comprise a stationary shearing blade 97 fixedly mounted at the extreme forward edge of the feed opening (Figures 1 and 3). A cooperating shear blade 98 is fixedly mounted on the adjacent side of the plunger head 32 and these blades 97 and 98 cut off the charge each time the plunger makes a pressing movement, thus making it unnecessary to let the press run idle for two or three plunger strokes in order to clear the bale before dropping the division block. Plunger 30 comprises four rearwardly extending tail members 99 (Figure 3) which are adapted to guide the plunger in its travel in the press chamber, and a left hand side plate 100 which is adapted to close the feed opening as the plunger moves forward in its pressing stroke. The plunger 30 is also reinforced by truss members 101 disposed in any suitable manner in its tail section. Fixedly or integrally extending from plunger head 32 are a pair of ears 102 which pivotally carry a roller 103 which is disposed on the opposite side of the plunger from knife 98. A roller guide 104 is fixedly mounted at its rear end as at 105 to the right hand side of the press chamber, its forward end being provided with an extension 106 adapted to be engaged by roller 103 and to thus resiliently press knife blade 98 into effective shearing engagement with stationary knife 97, roller guide 104 being yieldable outwardly to a slight extent to provide the desired shearing action. The forward end of roller guide 104 is adapted to be adjusted inwardly or outwardly by means of a flat member 107 carried on a fixed bolt 108 provided with adjusting nuts 109 and with a spring 110 engaging a fixed portion of the press and adapted to urge member 107 outwardly. In this way the roller guide 104 can be adjusted transversely to keep the shear blades 98 and 97 operating at the proper clearance.

*Automatic block dropping device*

The automatic block dropping device comprises a circular serrated wheel 111 which projects downwardly through a slot 112 in the top 27 of the baling compartment. This wheel 111 comprises a plurality of radially adjustable serrated segments and is adapted to carry a pin 114 which projects from the wheel and which is adapted to trip the block dropping device in a manner which will presently appear. Serrated wheel 111 is adapted to be rotated by the compressing movement of the hay within the baling chamber 26. The length of the bale is gauged by the circular wheel 111 and this wheel 111 is made adjustable in diameter so that the length of the bale may be adjusted as desired.

The division block 115 is placed manually in a trough 116 formed on the top of the press chamber and reclines therein slightly rearwardly against a supporting member 117. Trough 116 communicates with an opening 118 in the top of the press chamber, this opening 118 being adapted to allow the division block to pass downwardly therethrough at the proper time into the press chamber at a point just ahead of the forward edge of the feed opening which carries knife blade 97. The division block 115 is normally supported by a pair of rods 119 extending through one side of trough member 116. These rods 119 remain in place while the bale is being built up and when the bale has been built up, wheel 111 will have rotated until pin 114 will have tripped arm 120. The tripping mechanism comprising the wheel 111 and the arm 120 will permit release of the pin 123 from the locking portion 124 of arm, thus allowing pin 123 and arm 125 upon which pin 123 is fixedly mounted and to which slide rods 119 are fixedly attached to move forwardly. Arm 125 is fixedly mounted on a crank member 126 which has a crank end 127 adapted to be moved forwardly by reason of its operative interposition between a pair of coil springs 128 which are mounted between two members 129 and 130 upon an operating rod 131. End 127 is provided with an ear 45 slidably encircling rod 131, springs 128 abutting against ear 45. Rod 131 is reciprocated continuously during operation of the device by reason of its pivoted attachment to a crank member 132 (Figure 1) which is fixedly mounted on stubshaft 24 of the right hand bull gear 22.

Thus operating rod 131 which is reciprocated continuously is ineffective to withdraw pins 119 forwardly and to thereby drop the division block 115 onto plunger 30 except when wheel 111 has made a complete revolution corresponding to the length of the bale and has tripped arm 121 upwardly, allowing rod 131 to withdraw the slide rods 119 as rod 131 moves forwardly. The angular disposition of crank arm 132 upon stubshaft 24 is such that operating rod 131 releases a division block 115 downwardly upon plunger 30 only when the plunger 30 is forward of the opening 118, thus preventing the plunger 30 from striking a division block and causing damage. Upon the retraction of plunger 30 the block 115 is dropped in front thereof. Even though pin 114 trips arm 121 at any other time than when plunger 30 is forward of the opening 118, the operating interconnection is such that rod 131 would be moving rearwardly and thus would be tending to pull arm 125 rearwardly towards opening 118, and thus tending to push the slide rods 119 rather than withdraw them from the trough 116.

Figure 2:
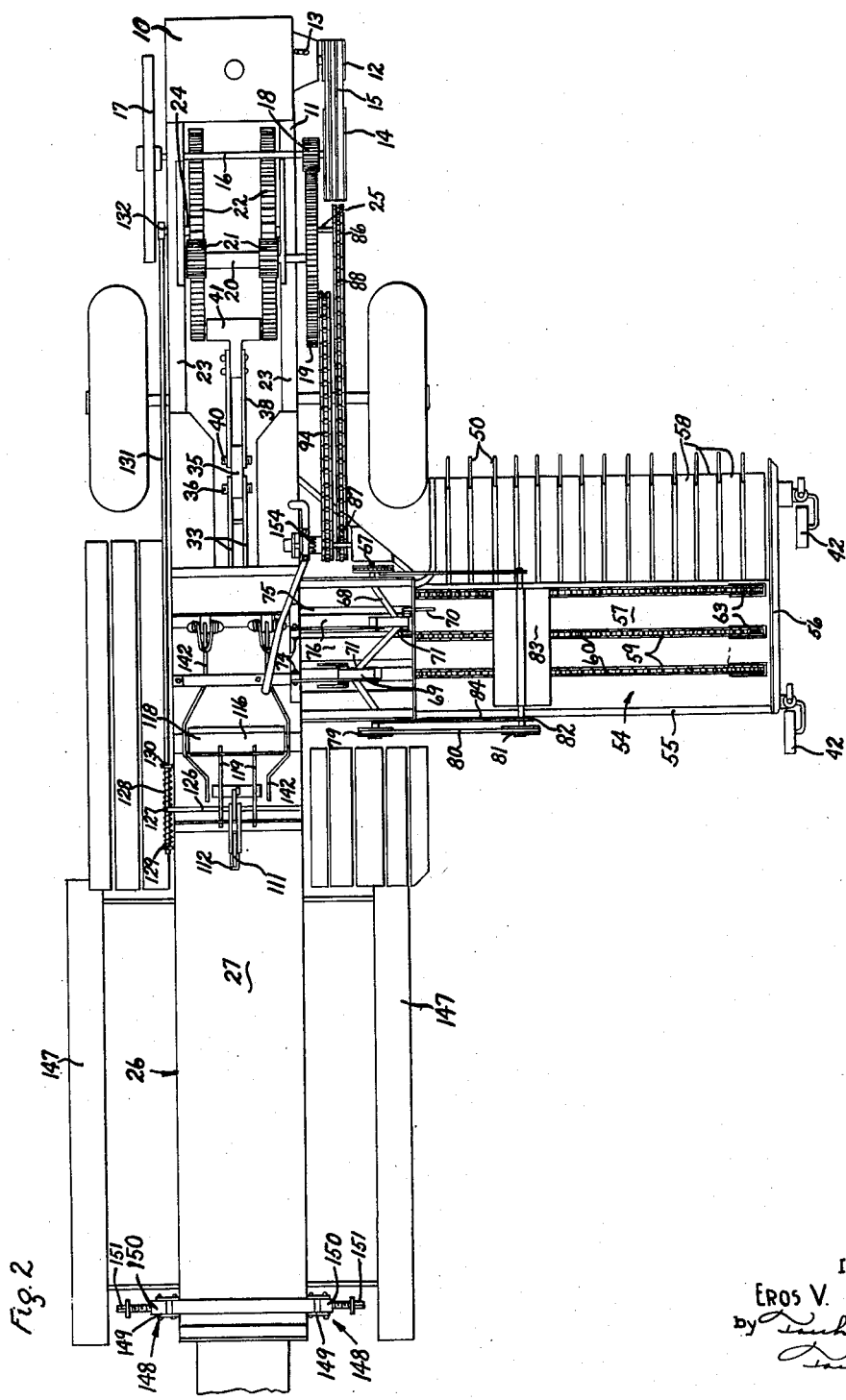
Figure 2 is a plan view of the baler.

In order to hold the compressed charges of hay, or the division block 115 from coming rearwardly as plunger 30 is retracted, spring pressed hook arms 142 are provided on the top and bottom of the press chamber, the upper pair of hook members being formed so as to surround the division block opening 118, as indicated in Figure 2. Preferably, spring pressed hook members 143 are also provided opposite hook members 142 and upon the sides of the press (Figure 3).

The automatic block dropper described herein is rendered completely successful due to the fact that the bale chamber is cleaned after each stroke by reason of the operation of the knives 97 and 98 described above so that the block has a free space into which to go and may be dropped upon any retraction stroke of the plunger 30. Thus it is not necessary to run the press two or three idle strokes without feeding material through it, in order to get the division block in place. With prior balers, it was necessary to stop the machine, declutch the feeder and run the press plunger several idle strokes.

Figure 1 also illustrates the running board construction upon which the operators of the press who insert and tie the baling wires may stand. These running boards 147 are supported in any suitable manner from the machine and extend alongside the compression portion of the baling press.

Figure 1 also illustrates the adjustable mechanism 148 disposed on each side of the open end of the baling chamber and adapted to constrict this end of the baling chamber so as to retain the bale therewithin to form an abutment against which a succeeding bale may be pressed. This toggle mechanism comprises arms 149 connected to the top and bottom of the press chamber and to an internally threaded member 150 within which is disposed a screw threaded adjusting rod 151. Thus as rod 151 is screwed inwardly, it forces the sides of the press inwardly and the pressure of the bale pulls the top and bottom of the press inwardly, thereby constricting the opening on all four sides.

General

The V-belt main drive embodying multiple V-belts 15 provides a safety device since the large pulley 14 which the V-belts drive also acts as a friction relief clutch to prevent damage to the baler in case any obstruction should be encountered in any portion thereof.

A clutch 154 (Figure 2) may be provided if desired for disengaging the drive to the bevel gears 95 and 96 driving the feeding attachment, namely shafts 68 and 62.

It will be understood that plunger 30 may be cut away as at 155 (Figure 3) to permit it to pass by hook members 142 and 143.

In Figure 5 there is portrayed an improved and preferred form of baling chamber which is narrowed at the point 156 which is located immediately after the point where the division block 115 is dropped and on the side opposite the feed opening, thus preventing material being baled from crowding around the block 115 and making it difficult for the operator to find the block for inserting wires for tying. This construction also gives plenty of clearance for the block 115 to drop into position through opening 118. The plunger 30 is correspondingly cut away at 159.

I wish it to be understood that I intend to include as within my invention such modifications as may be necessary to adapt the same to varying conditions and uses and as fall within the terms or the spirit of the appended claims.

Having thus fully described my invention, what I claim as new and desire to secure by Letters Patent is:

1. A method of baling which comprises the steps, of picking up material from the ground by means of a mechanism operated at a substantially constant rate to continuously forward material to a feeding mechanism, of feeding the material toward a compression chamber at a greater rate when the chamber is open than when it is closed, and of compacting the charges so fed in the compression chamber.

2. A method of baling which comprises the steps, of continuously picking up material from the ground and loading same upon a platform, of continuously advancing material along the platform toward a compression chamber, of increasing the rate of advancement to condense the material while feeding the same into the compression chamber, of compressing the condensed charges as fed into the chamber, and of shearing off each charge at the entrance point to the chamber simultaneously with the compressing step.

3. A method of baling which comprises continuously advancing material to a compression chamber and of increasing the rate of advancement of the material to the compression chamber prior to compressing the material fed into the compression chamber.

4. A method of baling which comprises the steps, of continuously advancing material toward the feed opening of a compression chamber, of periodically opening the feed opening, and of increasing the rate at which the material is advanced toward the chamber when the feed opening is open.

5. A method of baling which comprises the steps of continuously advancing material toward the feed opening of a compression chamber, of periodically opening the feed opening and retracting the compression plunger operating in the compression chamber, and of increasing the rate at which the material is advanced to the chamber when the feed opening is open and the plunger is retracted.

6. A method of baling which comprises the steps of continuously advancing material toward the feed opening of a compression chamber, of periodically opening the feed opening and retracting the compression plunger operating in the compression chamber, of increasing the rate at which the material is advanced to the chamber when the feed opening is open and the plunger is retracted, and of reducing the rate at which the material is advanced to the chamber when the plunger is on a compression stroke.

7. A method of baling which comprises the steps, of continuously picking up material from the ground by means of a mechanism operated at a substantially constant rate to continuously forward material upon a platform, of continuously moving material forward on the platform toward the side of a compression chamber, of increasing the rate at which material is fed into the chamber when the chamber is open, of compacting the charge fed within the chamber by means of the feeding mechanism, and of shearing off each charge at the entrance point to the chamber subsequent to the compacting step.

8. A method of baling which comprises the steps, of continuously feeding material to a compression chamber in regular cycles, each cycle having a period of small volume feed and a period of large volume feed, of advancing the large volume of material toward the compression chamber at a greater rate than the small volume to condense the large volume of material within the compression chamber, and of compressing the condensed charge fed into the chamber by means of the plunger operated therein.

9. A method of baling which comprises the steps of continuously feeding material to the feed opening of a compression chamber, of increasing the volume of material fed when the feed opening is open, of condensing the material while being fed in greater volume into the compressing chamber, of compressing the condensed charge fed into the chamber, and of shearing off each charge at the entrance point to the chamber during the compressing step.

EROS V. BARKER.